United States Patent [19]

Kioka et al.

[11] Patent Number: 4,874,734

[45] Date of Patent: Oct. 17, 1989

[54] PROCESS FOR PRODUCING SOLID CATALYST FOR POLYMERIZATION OF OLEFINS

[75] Inventors: Mamoru Kioka; Norio Kashiwa, both of Iwakuni, Japan

[73] Assignee: Mitsui Petrochemical Industries, Ltd., Tokyo, Japan

[21] Appl. No.: 174,967

[22] Filed: Mar. 29, 1988

[30] Foreign Application Priority Data

Apr. 3, 1987 [JP] Japan ................................ 62-81287

[51] Int. Cl.$^4$ ................................................ C08F 4/64
[52] U.S. Cl. .................................... 502/104; 502/103; 502/108; 502/113; 502/117; 502/120
[58] Field of Search ............... 502/104, 103, 108, 113, 502/117, 120

[56] References Cited

U.S. PATENT DOCUMENTS

| 4,404,344 | 9/1983 | Sinn et al. ........................ 502/117 X |
| 4,508,843 | 4/1985 | Etherton et al. ................ 502/108 X |
| 4,542,199 | 9/1985 | Kaminsky et al. .............. 502/117 X |
| 4,568,658 | 2/1986 | Cook et al. ..................... 502/104 X |
| 4,665,047 | 5/1987 | Slaugh et al. ................... 502/108 X |
| 4,701,432 | 10/1987 | Welborn ......................... 502/117 X |
| 4,752,597 | 6/1988 | Turner ............................ 502/104 |

*Primary Examiner*—Patrick P. Garvin
*Attorney, Agent, or Firm*—Sherman & Shalloway

[57] ABSTRACT

A process for producing a solid catalyst for polymerization of olefins, which comprises bringing a solution of an aluminoxane into contact with a suspension of a particulate carrier having supported thereon a compound of a transition metal of Group IVB of the periodic table in a solvent in which the aluminoxane is insoluble or sparingly soluble. In another aspect, the invention provides a process for producing a solid catalyst for polymerization of olefins, which comprises bringing a suspension of a particulate carrier having supported thereon a compound of a transition metal of Group IVB of the periodic table in a solution of an aluminoxane into contact with a solvent in which the aluminoxane is insoluble or sparingly soluble.

34 Claims, No Drawings

PROCESS FOR PRODUCING SOLID CATALYST FOR POLYMERIZATION OF OLEFINS

BACKGROUND OF THE INVENTION

1. Field of the Invention

This invention relates to a process for producing a solid catalyst for polymerization of olefins. More specifically, it relates to a process for producing a solid catalyst for polymerization of olefins by using a solution of an aluminoxane, a particulate carrier having a transition metal compound supported thereon, and a solvent in which the aluminoxane is insoluble or sparingly soluble.

2. Description of the Prior Art

Conventional processes for producing alpha-olefin polymers, especially an ethylene homopolymer or an ethylene/alpha-olefin copolymer involve polymerizing ethylene or copolymerizing ethylene and an alpha-olefin in the presence of a titanium catalyst composed of a titanium compound and an organoaluminum compound or a vanadium catalyst composed of a vanadium compound and an organoaluminum compound. Generally, ethylene/alpha-olefin copolymers obtained with the titanium catalysts have a broad molecular weight distribution and a broad composition distribution and have inferior transparency, freedom from surface tackiness and dynamical properties. Ethylene/alpha-olefin copolymers obtained with the vanadium catalysts have a narrower molecular weight distribution and a narrower composition distribution than those obtained with the titanium catalysts, and show a considerable improvement in transparency, freedom from surface tackiness and dynamical properties. However, these catalysts have low polymerization activity, and it is necessary to remove the catalysts from the resulting polymers. It is desired therefore to elevate the polymerization activity of these catalysts.

Recently, catalysts composed of zirconium compound and aluminoxanes were proposed as a new type of Ziegler catalysts for polymerization of alpha-olefins.

Japanese Laid-Open Patent Publication No. 19,309/1983 describes a process for polymerizing ethylene and at least one alpha-olefin having 3 to 12 carbon atoms at a temperature of $-50°$ C. to $200°$ C. in the presence of a catalyst formed from a transition metal-containing compound represented by the following formula (cyclopentadienyl)$_2$MeRHal wherein R represents cyclopentadienyl, $C_1-C_6$ alkyl, or halogen, Me represents a transition metal, and Hal represents halogen, and a linear aluminoxane represented by the following formula $Al_2OR^4(Al(R)-O)_n$ wherein R is methyl or ethyl and n is a number of 4 to 20, or a cyclic aluminoxane represented by the following formula

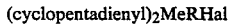

This patent document describes that to adjust the density of the resulting polyethylene, the polymerization of ethylene should be carried out in the presence of up to by weight of an alpha-olefin having a slightly long chain or its mixture.

Japanese Laid-Open Patent Publication No. 95,292/1984 describes a process for producing a linear aluminoxane represented by the following formula

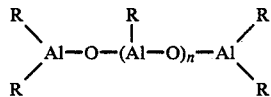

wherein n is 2 to 40, and R is $C_1-C_4$ hydrocarbon group, and a cyclic aluminoxane represented by the following formula

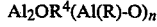

wherein n and R are as defined above. This patent document discloses that an ethylene is polymerized in the presence of a mixture of methylaluminoxane with a bis(cyclopentadienyl) compound of zirconium, polyethylene can be obtained in an amount of at least 25 million grams per gram of the transition metal per hour.

Japanese Laid-Open Patent Publication No. 35,005/1985 discloses a process for producing a catalyst for polymerization of olefins, which comprises reacting an aluminoxane compound represented by the following formula

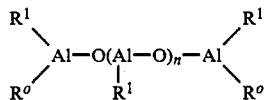

wherein $R^1$ is $C_1-C_{10}$ alkyl, and $R^o$ is $R_1$ or is bonded to $R^1$ to represent —O—, with a magnesium compound, then chlorinating the reaction product, and treating the chlorinated product with a compound of V, Zr or Cr. This patent document describes that the resulting catalyst is especially suitable for copolymerization of a mixture of ethylene with a $C_3-C_{12}$ alpha-olefin.

Japanese Laid-Open Patent Publication No. 35,006/1985 discloses a combination of (a) two or more dissimilar mono-, di- and tri-cyclopentadienyls or their derivatives of transition metals and (b) an aluminoxane as a catalyst for preparation of reactor blended polymers. Example 1 of this Japanese Laid-open Patent Publication shows that ethylene and propylene are polymerized in the presence of a catalyst composed of bis(pentamethylcyclopentadienyl)dimethyl zirconium and an aluminoxane to provide polyethylene having a number average molecular weight of 15,300, a weight average molecular weight of 36,400 and a propylene content of 3.4%. In Example 2 of this patent document, ethylene and propylene are polymerized in the presence of a catalyst composed of bis(methylcyclopentadienyl)zirconium dichloride and an aluminoxane to afford a blend of polyethylene and an ethylene/propylene copolymer consisting of a toluene-soluble portion having a number average molecular weight of 2,200 and a weight average molecular weight of 11,900 and containing 30 mole % of a propylene component and a toluene-insoluble portion having a number average molecular weight of 3,000 and a weight average molecular weight of 7,400 and containing 4.8 mole % of a propylene component, said blend having a number average molecular weight of 2,000 and a weight average molecular weight of 8,300 and containing 7.1 mole % of a propylene component. Example 3 of this document describes a blend of LLDPE and an ethylene-propylene copolymer consisting of a soluble portion having a molecular weight distribution ($\overline{Mw}/\overline{Mn}$) of 4.57 and containing 20.6 mole % of a propylene component and an insoluble portion having a molecular weight distribution of 3.04 and containing 2.9 mole % of a propylene component.

Japanese Laid-Open Patent Publication No. 35,007/1985 describes a process wherein ethylene alone is polymerized, or ethylene and an alpha-olefin having 3 or more carbon atoms are copolymerized, in the presence of a catalyst composed of a metallocene and a cyclic aluminoxane represented by the formula

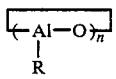

wherein R represents an alkyl group having to 5 carbon atoms and n represents an integer of 1 to about 20, or a linear aluminoxane represented by the formula

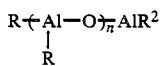

wherein R and n are as defined above. The patent document describes that the polymer yielded by the above process has a weight average molecular weight of about 500 to about 1,400,000 and a molecular weight distribution of 1.5 to 4.0.

Japanese Laid-Open Patent Publication No. 35,008/85 states that polyethylene or an ethylene/C-3-C10 alpha-olefin having a wide molecular weight distribution is produced by using a catalyst system composed of at least two metallocenes and aluminoxane. It discloses that the copolymer has a molecular weight distribution ($\overline{Mw}/\overline{Mn}$) of 2–50.

The catalysts formed from the transition metal compounds and aluminoxanes which are proposed in these prior art references have much higher polymerization activity than hitherto known catalyst systems composed of transition metal compounds and organoaluminum compounds. However, most of the catalyst systems proposed there are soluble in the reaction system and mainly used in solution polymerization. Accordingly, the viscosity of the polymerization system becomes very high, and the bulk density of the polymer obtained by after-treatment of the solution is low. It is difficult therefore to obtain a polymer having excellent powder properties.

On the other hand, attempts have been made to polymerize olefins by suspension polymerization or vapor-phase polymerization using catalysts wherein one or both of the aforesaid transition metal compounds and aluminoxanes are supported on carriers of porous inorganic oxides such as silica, silica/alumina and alumina.

For example, the above-cited Japanese Laid-Open Patent Publications Nos. 35,006/1985, 35,007/1985 and 35,008/1985 describe catalysts comprising transition metal compounds and aluminoxanes supported on silica, silica/alumina or alumina.

Japanese Laid-Open Patent Publications Nos. 106,808/1985 and 106,809/1985 propose a process for producing a composition composed of a polyethylene-type polymer and a filler formed by polymerizing ethylene or copolymerizing ethylene with an alpha-olefin in the presence of a substance obtained by previously contacting a highly active catalyst component containing titanium and/or zirconium and soluble in a hydrocarbon solvent with a filler, an organoaluminum compound, and a filler having affinity for polyolefins.

Japanese Laid-Open Patent Publication No. 31,404/1986 proposes a process for polymerizing ethylene or copolymerizing ethylene with an alpha-olefin in the presence of a catalyst mixture composed of a product obtained by reacting a trialkylaluminum with water in the presence of silicon dioxide and aluminum oxide, and a transition metal compound.

Japanese Laid-Open Patent Publication No. 276,805/1986 proposes a process for polymerizing an olefin in the presence of a catalyst composed of a zirconium compound and a reaction mixture obtained by reacting a reaction mixture of an aluminoxane and a trialkylaluminum with n inorganic oxide having a surface hydroxyl group such as silica.

Each of the carrier-supported solid catalysts proposed in the above prior art references is prepared by forming a suspension composed of the carrier and a solution of the aluminoxane and transition metal compound, evaporating the solvent from the suspension, and drying the residue. When olefins are polymerized or copolymerized in a suspension polymerization system or a vapor-phase polymerization system using these solid catalyst components, the polymerization activity of the solid catalyst components is much lower than in the case of performing the polymerization in the solution-polymerization system described above, and the inherent characteristics of the transition metal compound catalyst component and the aluminoxane catalyst component are not fully exhibited. Furthermore, the resulting polymers do not prove to be entirely satisfactory with regard to powder properties such as bulk density.

SUMMARY OF THE INVENTION

It is an object of this invention to provide a process for producing a solid catalyst for polymerization of olefins which can give an olefin polymer having a high bulk density and excellent powder properties with high polymerization activity.

Another object of this invention is to provide a process for producing a solid catalyst for polymerization of olefins in which an aluminoxane is deposited on a transition metal compound supported on a carrier, by using a specific solvent in which the aluminoxane is insoluble or sparingly soluble. This process offers the advantage that aggregation of catalyst particles or adhesion of catalyst particles to the reactor wall surface, which occur in the prior art in the step of depositing aluminoxane, can be eliminated, and the operability of the process can be improved, and simultaneously, the polymerization activity of the catalyst and the bulk density of the polymer can be increased.

In accordance with this invention, the above objects are achieved by (a) a process for producing a solid catalyst for polymerization of olefins, which comprises bringing a solution of an aluminoxane into contact with a suspension of particulate carrier having supported thereon a compound of a transition metal of Group IVB of the periodic table in a solvent in which an aluminoxane is insoluble or sparingly soluble, thereby to form a solid component; and (b) a process for producing a solid catalyst for polymerization of olefins, which comprises contacting a suspension of a particulate carrier having supported thereon a compound of a transition metal of Group IVB of the periodic table in a solution of an aluminoxane, with a solvent in which the aluminoxane is insoluble or sparingly soluble.

DETAILED DESCRIPTION OF PREFERRED EMBODIMENTS

For the production of the solid catalyst of this invention for polymerization of olefins, the following compounds (1) to (3) are used.

(1) A particulate carrier (D) supporting a IVB group transition metal, which is prepared by supporting a compound of a transition metal of Group IVB of the periodic table (catalyst component A) on particulate carrier (catalyst carrier C).

(2) An aluminoxane (catalyst component B).

(3) A solvent (E) in which the aluminoxane is insoluble or sparingly soluble.

The transition metal of Group IVB in the catalyst component (A) is selected from titanium, zirconium and hafnium. It is preferably titanium or zirconium, the The compound of the IVB transition metal in the catalyst component (A) may be, for example, a zirconium compound containing a group having a conjugated $\pi$ electron as a ligand.

Examples of the zirconium compound having a conjugated $\pi$ electron as a ligand are compounds of the following formula (I)

$$R^1{}_k R^2{}_l R^3{}_m R^4{}_n Zr \qquad (I)$$

wherein $R^1$ represents a cycloalkadienyl group or a substituted cycloalkadienyl group, each of $R^2$, $R^3$ and $R^4$ represents a cycloalkadienyl group, an aryl group, an alkyl group, a cycloalkyl group, an aralkyl group, a halogen atom, a hydrogen atom, $OR^a$, $SR^b$, $NR^c$, or $PR_2{}^d$, $R^a$, $R^b$, $R^c$ and $R^d$ each represent a hydrocarbon group such as an alkyl, cycloalkyl, aryl or aralkyl group, or a silyl group, the two $R^c$'s or two $R^d$'s may be linked to each other to form a ring, k is not more than 1, and $k+l+m+n$ is 4; provided that when $R^2$ represents a cycloalkadienyl group, $R^1$ and $R^2$ may be bonded to each other via a lower alkylene group.

Examples of the cycloalkadienyl group are cyclopentadienyl, methylcyclopentadienyl, ethylcyclopentadienyl, pentamethylcyclopentadienyl, dimethylcyclopentadienyl, indenyl, ethylenebis-indenyl and tetrahydroindenyl groups. Examples of the alkyl group are methyl, ethyl, propyl, isopropyl, butyl, hexyl, octyl, 2-ethylhexyl, decyl and oleyl groups. Examples of the aryl group are phenyl and tolyl groups. Examples of the aralkyl groups are benzyl and neophile groups. Examples of the cycloalkyl group are cyclopentyl, cycloyhexyl, cyclooctyl, norbornyl and bicyclononyl groups and alkyl-substituted derivatives of these groups. Examples of the silyl group are trimethylsilyl, triethylsilyl, phenyldimethylsilyl and triphenylsilyl groups. There can also be cited unsaturated aliphatic groups such as vinyl, allyl, propenyl, isopropenyl and 1-butenyl groups, and unsaturated alicyclic groups such as a cyclohexenyl group. The halogen atom may be, for example, fluorine, chlorine or bromine. Examples of the lower alkylene group are methylene, ethylene, propylene and butylene groups.

Specific examples of the zirconium compounds of the above formula (I) include:
bis(cyclopentadienyl)zirconium monochloride monohydride,
bis(cyclopentadienyl)zirconium monobromide monohydride,
bis(cyclopentadienyl)methylzirconium hydride,
bis(cyclopentadienyl)ethylzirconium hydride,
bis(cyclopentadienyl)cyclohexylzirconium hydride,
bis(cyclopentadienyl)phenylzirconium hydride,
bis(cyclopentadienyl)benzylzirconium hydride,
bis(cyclopentadienyl)neopentylzirconium hydride,
bis(methylcyclopentadienyl)zirconium monochloride monohydride,
bis(indenyl)zirconium monochloride monohydride,
bis(cyclopentadienyl)zirconium dichloride,
bis(cyclopentadienyl)zirconium dibromide,
bis(cyclopentadienyl)methylzirconium monochloride,
bis(cyclopentadienyl)ethylzirconium monochloride,
bis(cyclopentadienyl)cyclohexylzirconium monochloride,
bis(cyclopentadienyl)penylzirconium monochloride,
bis(cyclopentadienyl)benzylzirconium monochloride,
bis(methylcyclopentadienyl)zirconium dichloride,
bis(pentamethylcyclopentadienyl)zirconium dichloride,
bis(indenyl)zirconium dichloride,
bis(indenyl)zirconium dibromide,
bis(cyclopentadienyl)diphenylzirconium,
bis(cyclopentadienyl)dibenzylzirconium,
bis(cyclopentadienyl)methoxyzirconium chloride,
bis(cyclopentadienyl)methoxyzirconium chloride,
bis(cyclopentadienyl)ethoxyzirconium chloride,
bis(cyclopentadienyl)butoxyzirconium chloride,
bis(cyclopentadienyl)2-ethylhexoxyzirconium chloride,
bis(cyclopentadienyl)methylzirconium ethoxide,
bis(cyclopentadienyl)methylzirconium butoxide,
bis(cyclopentadienyl)ethylzirconium butoxide,
bis(cyclopentadienyl)phenylzirconium ethoxide,
bis(cyclopentadienyl)benzylzirconium ethoxide,
bis(methylcyclopentadienyl)ethoxyzirconium chloride,
bis(indenyl)ethoxyzirconium chloride,
bis(cyclopentadienyl)ethoxyzirconium chloride,
bis(cyclopentadienyl)butoxyzirconium chloride,
bis(cyclopentadienyl)2-ethylhexoxyzirconium chloride,
bis(cyclopentadienyl)phenoxyzirconium chloride,
bis(cyclopentadienyl)cyclohexoxyzirconium chloride,
bis(cyclopentadienyl)phenylmethoxyzirconium chloride,
bis(cyclopentadienyl)methylzirconium phenylmethoxide,
bis(cyclopentadienyl)trimethylsiloxyzirconium chloride,
bis(cyclopentadienyl)triphenylsiloxyzirconium chloride,
bis(cyclopentadienyl)thiophenylzirconium chlroide,
bis(cyclopentadienyl)thioethylzirconium chloride,
bis(cyclopentadienyl)bis(dimethylamide)zirconium,
bis(cyclopentadienyl)diethylamide zirconium chloride,
ethylenebis(indenyl)ethoxyzirconium chloride,
ethylenebis(4,5,6,7-tetrahydro-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride, ethylenebis(indenyl)methylzirconium monochloride,
ethylenebis(indenyl)zirconium dichloride,
ethylenebis(indenyl)zirconium bromide,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium chloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium diethoxide,
ethylenebis(4,5,6,7-tetrahydro-1-indenyl)methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

Examples of the titanium compound include:
bis(cyclopentadienyl)titanium monochloride monohydride,
bis(cyclopentadienyl)methyltitanium hydride,
bis(cyclopentadienyl)phenyltitanium chloride,
bis(cyclopentadienyl)benzyltitanium chloride,
bis(cyclopentadienyl)titanium dichloride,
bis(cyclopentadienyl)dibenzyltitanium,
bis(cyclopentadienyl)ethoxytitanium chloride,
bis(cyclopentadienyl)butoxytitanium chloride,
bis(cyclopentadienyl)methyltitanium ethoxide,
bis(cyclopentadienyl)phenoxytitanium chloride,
bis(cyclopentadienyl)trimethylsiloxytitanium chloride,
bis(cyclopentadienyl)thiophenyltitanium chloride,
bis(cyclopentadienyl)bis(dimethylamide)titanium,
bis(cyclopentadienyl)diethoxytitanium,
ethylenebis(indenyl)titanium dichloride, and
ethylenebis(4,5,6,7-tetrahydro-1-indenyl)titanium dichloride.

Examples of the hafnium compound include:
bis(cyclopentadienyl)hafnium monochloride monohydride,
bis(cyclopentadienyl)ethylhafnium hydride,
bis(cyclopentadienyl)phenylhafnium chloride,
bis(cyclopentadienyl)hafnium dichloride,
bis(cyclopentadienyl)benzylhafnium,
bis(cyclopentadienyl)ethoxyhafnium chloride,
bis(cyclopentadienyl)butoxyhafnium chloride,
bis(cyclopentadienyl)methylhafnium ethoxide,
bis(cyclopentadienyl)phenoxyhafnium chloride,
bis(cyclopentadienyl)thiophenylhafnium chloride,
bis(cyclopentadienyl)bis(diethylamide)hafnium,
ethylenebis(indenyl)hafnium dichloride, and
ethylenebis(4,5,6,7-tetrahydro-1-indenyl)hafnium dichloride.

The aluminoxane as catalyst component (B) may be, for example, an organoaluminum compound of the following general formula (II) or (III).

In the above formulae (II) and (III), R represents a hydrocarbon group such as a methyl, ethyl, n-propyl, isopropyl, n-butyl or isobutyl group, preferably the methyl, ethyl or isobutyl group. The methyl group is especially preferred. The symbol p in formulae (II) and (III) represents an integer of at least 2, preferably at least 5, especially preferably at least 8.

In the aluminoxane of formula [II] or [III], the oxyaluminum units

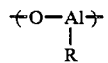

may be composed of mixed aluminum units containing different hydrocarbon groups. In this case, the aluminoxane is preferably an aluminoxane containing at least an oxymethylaluminum unit of formula

in an amount of at least 30 mole %, preferably at 50 mole %, especially preferably at least 70 mole %.

The aluminoxane may be a substituted aluminoxane having a substituent content of not more than 40% by weight, preferably not more than 30% by weight, especially preferably not more than 20% by weight and corresponding to general formula (II) or (III) in which part of the group R is substituted by a substituent, for example a halogen atom such as chlorine or bromine, a hydroxyl group, an alkoxy group, or the group —ONR.

The aluminoxane may be produced, for example, by the following methods.

(1) A method which comprises reacting a suspension of a compound containing water of adsorption or a salt containing water of crystallization, such as magnesium chloride hydrate, copper sulfate hydrate, aluminum sulfate hydrate, nickel sulfate hydrate or cerous chloride hydrate, in a hydrocarbon medium with a trialkylaluminum or a mixture of at least two trialkylaluminums.

(2) A method which comprises reacting a trialkyl aluminum or a mixture of at least two trialkylaluminums directly with water in a medium such as benzene, toluene, ethyl ether or tetrahydrofuran.

The method (1) is preferred.

The aluminoxane may contain small amounts of organometallic components, for example, a halogen-containing organoaluminum compound or an organometallic compound such as an organomagnesium compound, in addition to the trialkyl aluminum. A solvent that can be used to form a solution of the aluminoxane may be, for example, an aromatic hydrocarbon having 6 to 16 carbon atoms such as benzene, toluene, ethylbenzene, propylbenzene, butylbenzene, xylene, chlorobenzene or cumene.

Examples of the solvent (E) in which the aluminoxane is insoluble or sparingly soluble include linear or branched aliphatic saturated hydrocarbons having 4 to 16 carbon atoms such as n-pentane, isopentane, n-hexene, n-octane, isooctane, n-decane, isodecane and n-dodecane, and alicyclic hydrocarbons having 5 to 16 carbon atoms such as cyclopentane, cyclohexane, methylcyclopentane, methylcyclohexane and ethylcyclohexane.

Preferably, the solvent (E) has a higher boiling point than the solvent used for dissolving the aluminoxane.

The catalyst particle (C) is a particulate carrier, and may be a particulate inorganic or organic carrier.

Specific examples of the particulate inorganic carrier include $SiO_2$, $Al_2O_3$, $MgO$, $ZrO_2$, $TiO_2$, $B_2O_3$, $CaO$, $ZnO$, $BaO$, $ThO_2$, and mixtures of these such as $SiO_2$-$MgO$, $SiO_2$-$Al_2O_3$, $SiO_2$-$Ti_2$, $SiO_2V_2O_5$, $SiO_2$-$Cr_2O_3$, and $SiO_2$-$TiO_2$-$MgO$. These inorganic carriers are usually used after they are calcined at 150° to 1000°0 C., preferably 200° to 800° C. Carriers containing at least one of silica and alumina as a main component are preferred. These inorganic carriers may contain small amounts of carbonates, sulfates, nitrates and oxides such as sodium carbonate, potassium carbonate, calcium carbonate, magnesium carbonate, sodium sulfate, aluminum sulfate, barium sulfate, potassium nitrate, magnesium nitrate, aluminum, nitrate sodium oxide, potassium oxide and lithium oxide. The properties of the carriers vary with their types and the method of production. Preferred carriers used in this invention have a particle diameter of 5 to 200 micrometers, preferably 10 to 150 micrometers, especially preferably 20 to 100 micrometers.

Examples of the particulate organic carrier include polyolefins such as polyethylene, polypropylene, poly-1-butene and poly(4-methyl-1-pentene), polyolefins obtained by copolymerizing the monomers used as starting materials for the above polyolefins, polyesters, polyamides, polyvinyl chloride, polymethyl methacrylate, polymethyl acrylate, polystyrene, various natural polymers, and various monomeric compounds. The properties of these organic carriers differ depending upon their types and the method of production. Preferred carriers have a particle diameter of 5 to 200 micrometers, preferably 10 to 150 micrometers, especially preferably 20 to 100 micrometers. The molecular weights of these carriers may be such that they can exist as solids. For example, polyethylene may have a weight average molecular weight of about 1,000 to 10,000,000.

The particulate carrier (D) supporting the Group IVB transition metal used in this invention can be obtained, for example, by the following method, from the Group IVB transition metal compound (A) and the particulate carrier (C).

For example, the particulate carrier (C) is brought into contact with the transition metal compound (A) in the presence or absence of an inert solvent, and with or without removing the inert solvent, the carrier (D) supporting the IVB transition metal on which the catalyst component (A) is supported on the particulate carrier (C) is formed. Prior to contact with the catalyst component (A), the particulate carrier (C) may be preliminarily treated with an organometallic compound, an aluminoxane compound, or a halogen-containing silane compound, for example.

The organometallic compound used in the above preliminary treatment may be, for example, an organoaluminum compound, an organoboron compound, an organomagnesium compound, an organozinc compound or an organolithium compound. The organoaluminum compound is preferred. Specific examples of the organoaluminum compounds include trialkylaluminums such as trimethylaluminum, triethylaluminum, tri-n-butylaluminum and triisobutylaluminum; alkenylaluminums such as isoprenylaluminum; dialkylaluminum alkoxides such as dimethylaluminum methoxide, diethylaluminum ethoxide, dibutylaluminum butoxide and diisobutylaluminum methoxide; alkylaluminum sesquialkoxides such as methylaluminum sesquimethoxide and ethylaluminum sesquiethoxide; partially alkoxylated alkylaluminums having the average composition $R'_{2.5}Al(OR'')_{0.5}$; dialkyl aluminum halides such as dimethylaluminum chloride, diethylaluminum chloride and dimethylaluminum bromide; alkylaluminum sesquihalides such as methylaluminum sesquichloride and ethylaluminum sesquichloride; and alkylaluminum dihalides such as methylaluminum dichloride and ethylaluminum dichloride.

Among the above organoaluminum compounds, trialkylaluminums, dialkylaluminum chlorides and dialkylaluminum alkoxides are preferred. Especially preferred are trimethylaluminum, triethylaluminum, triisobutylaluminum, dimethylaluminum chloride, and diisobutylaluminum methoxide.

In the above preliminary treatment, the mixing ratio between the organometallic compound and the carrier, as the ratio of the amount in millimoles of the organometallic compound to the amount in grams of the carrier, is from 0.5 to 50, preferably from 1 to 30, more preferably from 1.5 to 20.

The preliminary treatment may be carried out by dispersing the catalyst carrier (C) in an inert solvent, adding at least one organometallic compound of the types described above, and maintaining the mixture at a temperature of 0° to 120° C., preferably 10° to 100° C., more preferably 20° to 90° C. for a period of 10 minutes to 10 hours, preferably 20 minutes to 5 hours, more preferably 30 minutes to 3 hours under atmospheric, reduced or elevated pressure.

Examples of the aluminoxane compound that can be used in the preliminary treatment are organoaluminum compounds represented by the following general formula (IV) and (V).

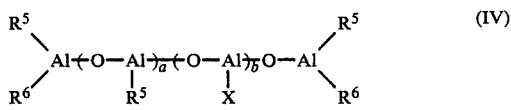

In the above formulae (IV) and (V), $R^5$ represents a hydrocarbon group such as a methyl, ethyl, propyl or butyl group, preferably the methyl or ethyl group. The methyl group is especially preferred. X is a halogen atom such as chlorine or bromine. $R^6$ is the above exemplified hydrocarbon group for $R^5$, or the above halogen. The letter a is usually a number of from 1 to 80, preferably from 1 to 30, and b is usually a number of 0 to 80, preferably 0 to 30. a+b is usually 4 to 100, preferably 8 to 50. In general- formulae (IV) and (V), the

units and

units are bonded in blocks, or random-bonded regularly or irregularly.

The mixing ratio between the aluminoxane compound and the carrier (C) in the preliminary treatment may be such that the aluminoxane compound is used in an amount of 0.001 to 100 millimoles, preferably 0.01 to 10 millimoles, more preferably 0.05 to 5 millimoles, per gram of the carrier compound. After the preliminary treatment, the liquid portion containing, for example, the excess of the aluminoxane compound may be removed from the reaction mixture by filtration, decantation or the like. The treatment of the catalyst carrier (C) with the aluminoxane may be carried out at a temperature of −50° C. to 200° C, preferably 0° to 100° C., more preferably 20°to 70° C., under atmospheric, reduced or elevated pressure for a period of 10 minutes to 10 hours, preferably 20 minutes to 5 hours.

The halogen-containing silane compounds that can be used in the above preliminary treatment is preferably a halogen-containing silane compound of the following formula

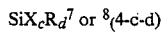 (VI)

wherein X represents Cl or Br, $R^7$ and $R^8$ each represent a hydrogen atom, an alkyl group having 1 to 12 carbon atoms, an aryl group, or a cycloalkyl group having 3 to 12 carbon atoms, c is a number of 1 to 4 and d is a number of 0 to 4, provided that c+d is a number of 1 to 4.

Specific examples of the halogen-containing silane compound include silicon tetrachloride, silicon tetrabromide, trichlorosilane, trichloromethylsilane, trichloroethylsilane, trichloropropylsilane, trichlorophenylsilane, trichlorocyclohexylsilane, tribromosilane, tribromoethylsilane, dichloromethylsilane, dichloromethylsilane, dichlorophenylsilane, dichloromethoxysilane, trichloroethoxysilane, trichloropropoxysilane, trichlorophenoxysilane, trichloroethoxysilane, dichloromethoxysilane, tichlorodimethoxysilane and trichlorosilanol. These compounds may be used singly or in combination. Silicon tetrachloride, trichlorosilane and trichloromethylsilane are especially preferred.

The mixing ratio between the halogen-containing silicon compound and the carrier (C) in the preliminary treatment may be such that the halogen-containing silicon compound is used in an amount of 0.001 to 10 millimoles, preferably 0.01 to 5 millimoles, more preferably 0.05 to 1 millimole, per gram of the carrier compound (C). Preferably, after the preliminary treatment, the liquid portion containing, for example, the excess of the halogen-containing silicon compound may be removed from the reaction mixture by filtration, decantation or the like. The treatment of the catalyst carrier (C) with the aluminoxane may be carried out at a temperature of −50° to 200° C., preferably 0° to 100° C., more preferably 20° to 70° C. under atmospheric, reduced or elevated pressure for a period of 10 minutes to 10 hours, preferably 20 minutes to 5 hours.

Another method of preparing the particulate carrier (D) supporting the group IVB transition metal comprises contacting a carrier compound having a surface hydroxyl group with the transition metal compound, thereby depositing the transition metal compound on the carrier.

In preliminarily treating the particulate carrier (C), an inert solvent may be used. Examples include aromatic hydrocarbons such as benzene, toluene, xylene, ethylbenzene, propylbenzene and cumene; linear or branched aliphatic hydrocarbons such as pentane, hexane, octane, decane and dodecane, alicyclic hydrocarbons such as cyclohexane, methylcyclopentane, cyclopentane, methylcyclohexane and ethylcyclohexane; and halogenated hydrocarbons such as chlorobenzene and ethylene dichloride.

In supporting the catalyst component (A) on the particulate carrier (C), the same inert solvent as exemplified above may be used. The inert solvent is preferably one capable of dissolving the catalyst component (A), for example an aromatic hydrocarbon or a halogen-containing hydrocarbon.

The solid catalyst of this invention may be produced by a process for forming it from the aluminoxane (B) and the particulate carrier (D) supporting the Group IVB transition metal, which at least includes a step of contacting a solution of the aluminoxane with the solvent (E) in which the aluminoxane is insoluble or sparingly soluble, thereby depositing the aluminoxane on the particulate carrier (D).

More specifically, the following processes may be cited as examples.

(a) A process for forming the solid catalyst which comprises contacting a solution of an aluminoxane with a suspension of a particulate carrier (D) supporting the Group IVB transition metal compound in the solvent (E) in which the aluminoxane is insoluble or sparingly soluble, thereby to form a solid component.

More specifically, by adding the aluminoxane solution to the suspension of the particulate carrier (D) in the solvent (E) or by adding the above suspension composed of the solvent (E) and the particulate carrier (D) to the aluminoxane solution, the aluminoxane is precipitated. As required, the solvent used in the aluminoxane solution may be removed by distillation from the above mixed suspension to promote precipitation of the aluminoxane. As a result, a solid catalyst having the aluminoxane deposited thereon, which is useful for polymerization of olefins, can be prepared.

The amount of the carrier (D) in the above suspension is usually 1 to 500 g, preferably 10 to 200 g, more preferably 20 to 100 g, per liter of the solvent. The contacting of the above suspension with the aluminoxane solution is carried out at a temperature of usually −100° to 300° C., preferably −50° to 100° C., more preferably 30 to 50° C. Usually, the contacting is carried out with stirring. The amount of the aluminoxane solution at the time of contacting is usually 1 to 1000 parts by weight, preferably 10 to 100 parts by weight, per 100 parts by weight of the suspension. In any one of the steps of this process, an electron donor component to be described may be added to form a solid catalyst containing the electron donor component.

The aluminoxane solution used to prepare the catalyst is formed at least from the aluminoxane and the aforesaid solvent used for dissolving the aluminoxane by, for example, simply mixing the two compounds, or first heating and then mixing them. The amount of the solvent in the solution is 0.1 to 50 liters, preferably 0.2 to 10 liters, more preferably 0.3 to 2 liters, per gram-atom of the aluminum in the aluminoxane.

(b) The process for preparing a solid catalyst for olefin polymerization in accordance with this invention is also one which comprises contacting a suspension of the particulate carrier (D) having the group IVB transition metal supported thereon in the aluminoxane solution, with the solvent (E) in which the aluminoxane is insoluble or sparingly soluble, thereby to form a solid component.

Specifically, by adding the solvent (E) to the above suspension composed of the aluminoxane solution and the carrier (D), or adding the suspension composed of the aluminoxane solution and the carrier (D) to the solvent (E), the aluminoxane is precipitated. If desired, the precipitation of the aluminoxane is promoted by evaporating the solvent used to dissolve the aluminoxane from the mixed suspension. As a result, a solid catalyst for olefin polymerization having the aluminoxane supported on the particulate carrier (D).

The amount of the solvent (E) used in the step of contacting the suspension composed of the aluminoxane solution and the particulate carrier (D) with the solvent (E) is usually 10 to 10000 parts by weight, preferably 100 to 1000 parts by weight, per 100 parts by weight of the aluminoxane solution. At the time of contacting, the temperature is usually $-100°$ to $300°$ C., preferably $-50°$ to $100°$ C., more preferably $-30°$ to $50°$ C. If desired, an electron donor component to be described may be added in any one of the steps of this process to form a solid catalyst containing the electron donor component.

The aluminoxane solution may be prepared as described above with regard to the process (a), and the amount of the solvent in the solution may also be the same as above. The amount of the carrier (D) dispersed in the aluminoxane solution is 1 to 500 g, preferably 10 to 200 g, more preferably 20 to 100 g, per liter of the aluminoxane solution.

The solid catalyst of this invention obtained by the above processes is a solid catalyst for polymerization of olefins, which is composed of (1) a particulate carrier supporting a transition metal of Group IVB of the periodic table, and (2) an aluminoxane, contains 0.5 to 500 mg-atom, as the transition metal atom, of the transition metal compound and 5 to 50,000 mg-atoms, as the aluminum atom, of the aluminoxane per 100 g of the particulate carrier and has an aluminum/transition atomic ratio (Al/M) of from 1 to 1000 and an average particle diameter of 5 to 200 micrometers.

The solid catalyst obtained by the processes of this invention may also contain the organometallic compound described above and/or the electron donor described below as optional components in addition to the above essential components.

The solid catalyst obtained by the processes of this invention contains the transition metal compound in an amount of 0.5 to 500 mg-atom, preferably 1 to 200 mg-atom, more preferably 3 to 50 mg-atom, per 100 g of the particulate carrier.

The atomic ratio of aluminum to the transition metal (Al/M) in the solid catalyst obtained by the processes of this invention is from 1 to 1000, preferably from 6 to 600, more preferably from 15 to 300.

The solid catalyst obtained by the processes of this invention has an average particle diameter of 5 to 200 micrometers, preferably 10 to 150 micrometers, more preferably 20 to 100 micrometers.

The solid catalyst obtained by the processes of this invention may contain an electron donor component in addition to the transition metal compound (A) and the aluminoxane (B). Examples of the electron donor are oxygen-containing compounds such as carboxylic acids, esters, ethers, ketones, aldehydes, alcohols, phenols, acid amides and compounds containing a metal atom (e.g., Al or Si)-O-C bond, nitriles, amines, and phosphines. The proportion of the electron donor is usually 0 to 1 mole per gram-atom of the transition metal atom (M).

The catalyst used by the processes of this invention is effective for the production of olefin polymers, particularly an ethylene polymer and a copolymer of ethylene and an alpha-olefin. Examples of the olefins which can be polymerized by using the above catalyst include ethylene and alpha-olefins having 3 to 20 carbon atoms, such as propylene, 1-butene, 1-hexene, 4-methyl-1-pentene, 1-octene, 1-decene, 1-dodecene, 1-tetradecene, 1-hexadecene, 1-octadecene and 1-eicocene.

Polymerization of olefins using the catalyst obtained by the processes of this invention is usually carried out in the vapor phase or the liquid phase, for example in slurry. In the slurry polymerization an inert hydrocarbon may be used as a solvent, or the olefin itself may be used as a solvent.

Specific examples of the hydrocarbon medium include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and light oil.

The slurry polymerization using the catalyst obtained by the processes of this invention may be carried out at a polymerization temperature of usually $-50°$ to $120°$ C., preferably $0°$ to $100°$ C.

The vapor-phase polymerization using the catalyst obtained by the present invention is carried out at a temperature of usually $0°$ to $120°$ C. $100°$ C.

The proportion of the transition metal compound used in the slurry polymerization or the vapor phase polymerization using the catalyst obtained by the processes of this invention is usually to $10^{-8}$ to $10^{-2}$ grama-tom/liter, preferably $10^{-7}$ to $10^{-3}$ gram-atom/liter, as the concentration of the transition metal atom.

If desired, in the polymerization reaction, the aluminoxane or an organoaluminum compound of the formula $R_p^h R_q^i AlX_{3-p-q}$ in which $R^h$ represents a hydrocarbon group 10 carbon atoms, preferably an alkyl group having 1 to 6 carbon atoms, an alkenyl group, a cycloalkyl group or an aryl group, $R^i$ represents an alkoxy group having 1 to 6 carbon atoms, or an aryloxy group, X represents a halogen atom or an linear or branched alkoxy group having 1 to 6 carbon atoms, p is a number of more than 0 but not exceeding 3, and q is a number of 0 to 2 may be additionally used. The addition of an organoaluminum compound having a branched chain group such as triisobutylaluminum or isoprenylaluminum or a monomethoxide thereof produces an effect of increasing polymerization activity.

The polymerization pressure is usually atmospheric pressure to 1000 kg/cm$^2$, preferably 2 to 50 kg/cm$^2$. The polymerization may be carried out batchwise, semicontinuously or continuously.

The polymerization may be carried out in two or more steps under different reaction conditions.

Prior to the polymerization of the olefin, the olefin is preferably pre-polymerized in the presence of the solid catalyst. The pre-polymerization is carried out by polymerizing 1 to 1000 g, preferably 5 to 500 g, more preferably 10 to 200 g, of the olefin, per gram-atom of the transition metal compound in the solid catalyst. Olefins used in pre-polymerization may be, for example, ethylene and alpha-olefins having 3 to 20 carbon atoms, such as propylene, 1-butene, 4-methyl-1-pentene, 1-hexene, 1-octene, 1-decene, 1-dodecene and 1-tetradecene.

The pre-polymerization temperature is $-20°$ C. to $70°$ C. $-10°$ C. to $60°$ C., more preferably $0°$ C. to $50°$ C.

The pre-polymerization may be carried out batchwise or continuously under atmospheric or elevated pressure. The pre-polymerization may be carried out in the presence of a molecular weight controlling agent, but the amount of the molecular weight controlling agent is preferably limited at least to one in which a pre-polymer having an intrinsic viscosity, measured in decalin at $135°$ C., of at least 0.1 dl/g, preferably 0.5 to 20 dl/g, can be produced.

The pre-polymerization is carried out in the absence of a solvent, or in an inert hydrocarbon medium. In view of operability, the pre-polymerization is preferably carried out in the inert hydrocarbon solvent. The inert hydrocarbon medium may be the same as the solvent (E) in which the aluminoxane is insoluble or sparingly soluble.

The concentration of the solid catalyst in the pre-polymerization system is usually $10^{-6}$ to 1 gram-atom/liter, preferably $10^{-4}$ to $10^{-1}$ gram-atom/liter, as the concentration of the transition metal atom in the solid catalyst.

The processes of this invention gives a solid catalyst which has very high polymerization activity in the homopolymerization and copolymerization of olefins, and can give polymers and copolymers having a high bulk density, a uniform particle size, a narrow molecular weight distribution and in the case of copolymer, a narrow composition distribution and containing little fine particles.

The following examples illustrate the present invention more specifically.

Preparation of an aluminoxane

A 400 ml fully nitrogen-purged flask was charged with 37 g of aluminum sulfate 14-hydrate and 125 ml of toluene, and then cooled to $0°$ C. Then, 500 ml of trimethylaluminum diluted with 125 ml of toluene was added dropwise. The temperature of the flask was then elevated to $40°$ C., and at this temperature, the reaction was continued for 30 hours. After the reaction, the reaction mixture was subjected to solid-liquid separation by filtration. The toluene was removed from the filtrate to give 13 g of aluminoxane as a white solid. It had a molecular weight, determined by freezing point depression in benzene, of 933. The p value in the catalyst component (B) was 14.

EXAMPLE 1

Preparation of silica supporting a zirconium compound

In a 400 ml glass flask fully purged with nitrogen and equipped with a stirrer, a mixed suspension of 3 g of silica (a product of Davison Company #952) calcined at $300°$ C. for 12 hours and 50 ml of trichlorosilane was stirred at $50°$ C. for 2 hours. After the reaction, the liquid portion was removed from the reaction mixture by using a filter, and the remaining solid portion was suspended in 50 ml of toluene. To the suspension was added 300 ml of toluene containing 15 millimoles of bis(cyclopentadienyl)zirconium dichloride at $25°$ C., and the mixture was reacted at $50°$ 2 hours with stirring. After the reaction, the liquid portion was removed from the suspension by using a filter. The remaining solid portion was washed twice with toluene to give silica having the zirconium compound supported on it. The amount of zirconium supported was 1.4% by weight.

Supporting of the aluminoxane on the silica having deposited the zirconium compound thereon A toluene solution (67 ml) containing the methylaluminoxane in an amount corresponding to 100 millimoles of Al atom and 2 g of the above silca having the zirconium compound supported on it were introduced into a 300 ml reactor being pressure-reducible and equipped with a stirrer, and with stirring at room temperature, 100 ml of purified n-decane was added over the course of about 0.5 hour to precipitate methylaluminoxane. While the inside of the reactor was reduced to a pressure of 4 torr by means of a vacuum pump, the temperature of the inside of the reactor was elevated to $35°$ C. over about 3 hours, thereby to remove the toluene and precipitate the methyl aluminoxane further. The reaction mixture was filtered by a filter, and the liquid portion was removed. The remaining solid portion was suspended. The composition of the resulting solid catalyst is shown in Table 1.

Preliminary polymerization

A 400 ml reactor equipped with a stirrer was charged with 100 ml of purified n-decane and the solid catalyst in an amount corresponding to 0.1 millimole of Zr under a nitrogen atmosphere. Then, ethylene was fed into the reactor at a rate of 4 Nl/hr for 1 hour, and during this time, the temperature was maintained at $20°$ C. After the feeding of ethylene, the inside of the reactor was purged with nitrogen, and again washed with purified n-hexane. The product was suspended in hexane and stored in a catalyst bottle.

Polymerization

Sodium chloride (250 g) as a dispersant was added to a 2-liter autoclave fully purged with nitrogen, and while the autoclave was heated at $90°$ C., the inside of the autoclave was reduced by a vacuum pump so that it reached 50 mmHg or below. The temperature of the autoclave was then lowered to $75°$ C., and the inside of the autoclave was purged with ethylene. The solid catalyst component subjected to the pre-polymerization was introduced in an amount of 0.007 millimole as Zr atom. The autoclave was sealed up, and 50 Nml of hydrogen added. The autoclave was pressurized with ethylene so that the pressure of the inside of the autoclave reached 8 kg/cm$^2$—G. The stirring speed was raised to 300 rpm, and ethylene was polymerized at $80°$ C. for 1 hour.

After the polymerization, all the polymer and the sodium chloride were taken out from the autoclave, and poured into about 1 liter of water. By stirring for about 5 minutes, almost all sodium chloride was dissolved in water, and only the polymer came afloat on the water surface. The floading polymer was recovered, washed fully with methanol, and dried overnight at 80° C. under reduced pressure. The results of the polymerization are shown in Table 1.

EXAMPLE 2

Preparation of silica supporting zirconium compound

In a 400 ml glass flask fully purged with nitrogen and equipped with a stirrer, 50 ml of a toluene solution containing 2 millimoles of halogenated aluminoxane was added to a suspension of 5 g of silica (a product of Davison Company #952) calcined at 800° C. for 12 hours and 100 ml of toluene. The temperature of the mixture was raised to 50° C., and the reaction was carried out at 50°C. for 2 hours. After the reaction, the liquid portion was removed from the reaction mixture by using a filter, and the remaining solid portion was suspended in 100 ml of toluene. To the suspension was added 9.4 ml of toluene containing 0.38 millimole of bis(cyclopentadienyl) rezirconium dichloride at 25° C., and the mixture was reacted at 25° C. for 2 hours with stirring. After the reaction, the liquid portion was removed from the suspension by using a filter. The remaining solid portion was washed twice with toluene to give silica having the zirconium compound supported on it. The amount of zirconium supported was 0.7% by weight.

The supporting of the aluminoxane on the resulting silica having the zirconium compound supported on it, the preliminary polymerization and the main polymerization were carried out in the same way as in Example 1. The results are shown in Table 1.

The halogenated aluminoxane was synthesized by the same method as described above for the synthesis of aluminoxane except that the amount of trimethylaluminum was changed to 24.7 ml from 50 ml, and 25.3 ml of dimethylaluminum chloride was added dropwise. The resulting halogenated aluminoxane had a degree of polymerization of 12.

EXAMPLE 3

Preparation of silica having a zirconium compound supported on it

A 200 ml fully nitrogen-purged flask was charged with 2.3 g of silica obtained by calcining silica (average particle diameter 70 micrometers, specific surface area 260 m²/g, pore volume 1.65 cm³/g) at 300° C. for 4 hours, 15 ml of a toluene solution of dimethylaluminum monochloride (1 mole-Al/liter of solution), and 50 ml of toluene, and then heated at 80° C. for 2 hours. The reaction mixture was subjected to solid-liquid separation by filtration. The solid portion was transferred to 50 ml of toluene, and 6.4 ml of a toluene solution of bis(cyclopentadienyl)zirconium dichloride (0.01 mole-Zr/liter of the solution) was added. The mixture was stirred at room temperature for 2 hours, and the mixture was subjected to solid-liquid separation by filtration. The solid portion was suspended in 100 ml of n-decane. While the suspension was stirred, 31 ml of a toluene solution of aluminoxane (2.3 mole-Al/liter of solution) was added. The mixture was warmed to 35° C., and by returning the pressure of the inside of the reactor to 4 torr, toluene was evaporated. The reaction suspension was filtered at −20° C. The solid portion was collected and suspended in 50 ml of n-decane.

The preliminary polymerization and main polymerization were carried out in the same way as in Example 1. The results are shown in Table 1.

EXAMPLE 4

Preparation of alumina supporting a zirconium compound

A 200 ml fully nitrogen-purged flask was charged with 5.8 g of alumina obtained by calcining alumina (average particle diameter 60 micrometers, specific surface area 270 m²/g, pore volume 1.05 ml/g) at 500° C. for 5 hours, 17 ml of a toluene solution of dimethylaluminum monochloride (1 mole-Al/liter of solution), and 50 ml of toluene, and heated at 80° for 2 hours. The reaction mixture was subjected to solid-liquid separation by filtration. The solid portion was transferred to 50 ml of toluene, and 32 ml of a toluene solution of bis(cyclopentadienyl)zirconium dichloride (0.036 mole-Zr/liter of solution) was added, and the mixture was heated at 80° C. for 1 hour. The reaction mixture was then subjected to solid-liquid separation by filtration to give alumina supporting the zirconium compound in an amount of 0.25% by weight as Zr.

The supporting of the aluminoxane on the aluminum having the zirconium compound supported on it, and the preliminary and main polymerizations were carried out as in Example 1. The results are shown in Table 1.

EXAMPLE 5

Preparation of silica supporting the zirconium compound

In a 400 ml fully nitrogen-purged flask equipped with a stirrer, 50 ml of a toluene solution containing 2 millimoles of the aluminoxane was added at room temperature to a suspension composed of 5 g of silica (#952, a product of Davison Company) calcined at 800° C. for 12 hours and 100 ml of toluene. The temperature of this mixture was raised to 50° C., and reacted at this temperature for 2 hours. After the reaction, the liquid portion was removed from the reaction mixture by using a filter. The remaining solid portion was suspended in 100 ml of toluene. To the suspension was added at 25° C. 9.4 ml of toluene containing 0.38 millimole of bis(cyclopentadienyl)zirconium dichloride, and the reaction was carried out at 25° C. for 2 hours with stirring. After the reaction, the liquid portion was removed from the suspension by using a filter. The remaining solid portion was washed twice with toluene to give silica having the zirconium compound supported on it. The amount of the zirconium supported one the silica was 0.6% by weight.

The supporting of the aluminoxane on the silica supporting the zirconium compound and the preliminary and main polymerizations were carried out as in Example 1. The results are shown in Table 1.

EXAMPLE 6

Example 1 was repeated except that the trichlorosilane (50 ml) was not used. The results are shown in Table 1.

COMPARATIVE EXAMPLES 1-6

Examples 1 to 6 were repeated respectively except that the operation of supporting the aluminoxane on the silica (or alumina) having the zirconium compound supported on it was carried out by reducing the pressure of the reaction system and thus evaporating toluene instead of using n-decane. The results are shown in Table 1.

TABLE 1

| Example (Ex.) and Comparative Example (CEx.) | Amount of Zr supported (wt %) | Amount of the polymer yielded (g) | Activity (g-PE/mM-Zr) | Apparent bulk density (g/ml) | MFI (g/10') |
| --- | --- | --- | --- | --- | --- |
| Ex. 1 | 0.5 | 84.7 | 12,100 | 0.46 | 10.6 |
| CEx. 1 | 0.3 | 35.8 | 5,100 | 0.44 | 7.3 |
| Ex. 2 | 0.3 | 93.2 | 13,300 | 0.46 | 8.6 |
| CEx. 2 | 0.2 | 57.2 | 8,200 | 0.45 | 8.0 |
| Ex. 3 | 0.04 | 106.7 | 15,200 | 0.46 | 2.1 |
| CEx. 3 | 0.02 | 46.7 | 6,700 | 0.40 | 3.6 |
| Ex. 4 | 0.07 | 59.9 | 8,600 | 0.44 | 3.6 |
| CEx. 4 | 0.04 | 21.2 | 3,000 | 0.40 | 4.6 |
| Ex. 5 | 0.3 | 74.8 | 10,700 | 0.46 | 6.6 |
| CEx. 5 | 0.2 | 48.8 | 7,000 | 0.45 | 5.7 |
| Ex. 6 | 0.01 | 16.1 | 2,300 | — | 6.3 |
| CEx. 6 | 0.01 | 9.8 | 1,400 | — | 3.8 |

What we claim is:

1. A process for producing a solid catalyst for polymerization of olefins, which comprises bringing a solution of an aluminoxane into contact with a suspension of a particulate carrier having supported thereon a compound of a transition metal of Group IVB of the periodic table in a solvent in which the aluminoxane is insoluble or sparingly soluble.

2. The process of claim 1 wherein the transition metal compound is a zirconium compound having a group containing a conjugated $\pi$ electron as a ligand.

3. The process of claim 2 wherein the zirconium compound is a compound represented by the following formula $$R^1{}_kR^2{}_lR^3{}_mR^4{}_nZr \qquad (I)$$

wherein $R^1$ represents a cycloalkadienyl group or a substituted cycloalkadienyl group, each of $R^2$, $R^3$ and $R^4$ represents a cycloalkadienyl group, an aryl group, an alkyl group, a cycloalkyl group, an aralkyl group, a halogen atom, a hydrogen atom, $OR^a$, $SR^b$, $NR^c$, or $PR_2{}^d$, $R^a$, $R^b$, $R^c$ and $R^d$ each represent a hydrocarbon group such as an alkyl, cycloalkyl, aryl or aralkyl group, or a silyl group, the two $R^c$'s or two $R^d$'s may be linked to each other to form a ring, k is not more than 1, and k+l+m+n is 4; provided that when $R^2$ represents a cycloalkadienyl group, $R^1$ and $R^2$ may be bonded to each other via a lower alkylene group.

4. The process of claim 3 wherein the cycloalkadienyl groups is a cyclopentadienyl, methylcyclopentadienyl, ethylcyclopentadienyl, pentamethylcyclopentadienyl, dimethylcyclopentadienyl, indenyl ,ethylenebisindenyl, or tetrahydroindenyl group.

5. The process of claim 3 wherein the zirconium compound is bis(cyclopentadienyl)zirconium dichloride, bis(methylcyclopentadienyl)zirconium dichloride, or ethylenebis-indenylzirconium dichloride.

6. The process of claim 1 wherein the aluminoxane is at least one organoaluminum compound selected from compounds of the following general formulae

(II)

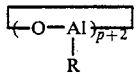

(III)

wherein R represents a hydrocarbon group, and p is an integer of at least 2.

7. The process of claim 6 wherein R is a methyl, ethyl, n-propyl, isopropyl, n-butyl or isobutyl group, and p is an integer of at least 8.

8. The process of claim 1 wherein the particulate inorganic carrier is at least one inorganic particulate carrier selected from the group consisting of $SiO_2$, $Al_2O_3$, $MgO$, $ZrO_2$, $TiO_2$, $B_2O_3$, $CaO$, $ZnO$, $BaO$ and $ThO_2$.

9. The process of claim 8 wherein the particulate inorganic carrier has a particle diameter of 5 to 200 micrometers.

10. The process of claim 8 wherein the particulate inorganic carrier has a particle diameter of 10 to 150 micrometers.

11. The process of claim 8 wherein the particulate inorganic carrier has a particle diameter of 20 to 100 micrometers.

12. The process of claim 1 wherein the particulate carrier is at least one solid organic compound selected from the group consisting of polyolefins, polyesters, polyamides, polyvinyl halides, polyalkyl methacrylates, polyalkyl acrylates and polystyrenes.

13. The process of claim 12 wherein the particulate organic compound has a particle diameter of 5 to 200 micrometers.

14. The process of claim 12 wherein the particulate organic compound has a particle diameter of 10 to 150 micrometers.

15. The process of claim 12 wherein the particulate organic compound has a particle diameter of 20 to 100 micrometers.

16. The process of claim 1 wherein the solvent in which the aluminoxane is insoluble or sparingly soluble is at least one solvent selected from the group consisting of aliphatic hydrocarbons having 4 to 16 carbon atoms and alicyclic hydrocarbons having 5 to 16 carbon atoms.

17. The process of claim 16 wherein the aluminoxane solution is a solution of the aluminoxane in at least one solvent selected from aromatic hydrocarbons having 6 to 16 carbon atoms.

18. A process for producing a solid catalyst for polymerization of olefins, which comprises bringing a suspension of a particulate carrier having supported thereon a compound of a transition metal of Group IVB of the periodic table in a solution of an aluminoxane into contact with a solvent in which the aluminoxane is insoluble or sparingly soluble.

19. The process of claim 18 wherein the transition metal compound is a zirconium compound having a group containing a conjugated $\pi$ electron as a ligand.

20. The process of claim 19 wherein the zirconium compound is a compound represented by the following formula

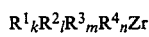 (I)

wherein $R_1$ represents a cycloalkadienyl group or a substituted cycloalkadienyl group, each of $R_2$, $R_3$ and $R_4$ represents a cycloalkadienyl group, an aryl group, an alkyl group, a cycloalkyl group, an aralkyl group, a halogen atom, a hydrogen atom, $OR^a$, $SR^b$, $NR^c$, or $PR_2^d$, $R^a$, $R^b$, $R^c$ and $R^d$ each represent a hydrocarbon group such as an alkyl, cycloalkyl, aryl or aralkyl group, or a silyl group, the two $R^c$'s or two $R^d$'s may be linked to each other to form a ring, k is not more than 1, and k+l+m+n is 4; provided that when $R^2$ represents a cycloalkadienyl group, $R^1$ and $R^2$ may be bonded to each other via a lower alkylene group.

21. The process of claim 20 wherein the cycloalkadienyl groups is a cyclopentadienyl, methylcyclopentadienyl, ethylcyclopentadienyl, pentamethylcyclopentadienyl, dimethylcyclopentadienyl, indenyl, ethylenebisindenyl, or tetrahydroindenyl group.

22. The process of claim 20 wherein the zirconium compound is bis(cyclopentadienyl)zirconium dichloride, bis(methylcyclopentadienyl)zirconium dichloride, or ethylenebis-indenylzirconium dichloride.

23. The process of claim 18 wherein the aluminoxane is at least one organoaluminum compound selected from compounds of the following general formulae

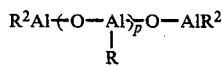 (II)

and

-continued

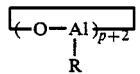 (III)

wherein R represents a hydrocarbon group, and p is an integer of at least 2.

24. The process of claim 23 wherein R is a methyl, ethyl, n-propyl, isopropyl, n-butyl or isobutyl group, and p is an integer of at least 8.

25. The process of claim 18 wherein the particulate inorganic carrier is at least one inorganic particulate carrier selected from the group consisting of $SiO_2$, $Al_2O_3$, MgO, $ZrO_2$, $TiO_2$, $B_2O_3$, CaO, ZnO, BaO and $ThO_2$.

26. The process of claim 25 wherein the particulate inorganic carrier has a particle diameter of 5 to 200 micrometers.

27. The process of claim 25 wherein the particulate inorganic carrier has a particle diameter of 10 to 150 micrometers.

28. The process of claim 25 wherein the particulate inorganic carrier has a particle diameter of 20 to 100 micrometers.

29. The process of claim 18 wherein the particulate carrier is at least one solid organic compound selected from the group consisting of polyolefins, polyesters, polyamides, polyvinyl halides, polyalkyl methacrylates, polyalkyl acrylates and polystyrenes.

30. The process of claim 29 wherein the particulate organic compound has a particle diameter of 5 to 200 micrometers.

31. The process of claim 29 wherein the particulate organic compound has a particle diameter of 10 to 150 micrometers.

32. The process of claim 29 wherein the particulate organic compound has a particle diameter of 20 to 100 micrometers.

33. The process of claim 18 wherein the solvent in which the aluminoxane is insoluble or sparingly soluble is at least one solvent selected from the group consisting of aliphatic hydrocarbons having 4 to 16 carbon atoms and alicyclic hydrocarbons having 5 to 16 carbon atoms.

34. The process of claim 18 wherein the aluminoxane solution is a solution of the aluminoxane in at least one solvent selected from aromatic hydrocarbons having 6 to 16 carbon atoms.

* * * * *

UNITED STATES PATENT AND TRADEMARK OFFICE
CERTIFICATE OF CORRECTION

PATENT NO. : 4,874,734
DATED : October 17, 1989
INVENTOR(S) : Mamoru Kioka and Norio Kashiwa It is certified that error appears in the above-identified patent and that said Letters Patent is hereby corrected as shown below:

Claim 20, lines 6 and 7, delete "$R_2$, $R_3$ and $R_4$", insert --$R^2$, $R^3$ and $R^4$--.

Signed and Sealed this

Fourth Day of September, 1990

Attest:

HARRY F. MANBECK, JR.

*Attesting Officer*   *Commissioner of Patents and Trademarks*